United States Patent [19]

Maurer

[11] 3,998,289

[45] Dec. 21, 1976

[54] BRAKE SYSTEM FOR AN ARTICULATED VEHICLE

[75] Inventor: Herman Joseph Maurer, Terre Haute, Ind.

[73] Assignee: J. I. Case Company, Racine, Wis.

[22] Filed: Nov. 5, 1975

[21] Appl. No.: 628,989

[52] U.S. Cl. .............................. 180/6.64; 180/135
[51] Int. Cl.$^2$ ...................................... B62D 11/00
[58] Field of Search .................. 180/135, 6.64, 6.2, 180/6.24, 6.26, 6.28, 6.30, 45; 280/432

[56] References Cited

UNITED STATES PATENTS

| | | | |
|---|---|---|---|
| 2,741,337 | 4/1956 | Ziskal | 180/6.2 X |
| 2,922,482 | 1/1960 | Fisher | 180/45 |
| 3,054,476 | 9/1962 | Corrigan | 280/432 X |
| 3,603,424 | 9/1971 | Blood | 180/6.64 |
| 3,863,991 | 2/1975 | Wilson | 180/6.2 |
| 3,877,537 | 4/1975 | Ohms | 180/6.3 |
| 3,893,528 | 7/1975 | Rehfeld | 180/6.3 |

*Primary Examiner*—Robert R. Song
*Assistant Examiner*—R. Schrecengost
*Attorney, Agent, or Firm*—Arthur J. Hansmann

[57] ABSTRACT

A brake system for an articulated vehicle having two portions pivoted together and with each portion including ground-supporting wheels such that there are two right-side wheels and two left-side wheels on the vehicle. Steering mechanism controls the articulation of the vehicle, and there is a brake system which includes two pedals and two brake lines connected to brakes on the right side of the vehicle, for braking the two wheels on the right side, and likewise for the left side of the vehicle, all for furthering the turning of the vehicle about a turning axis.

1 Claim, 2 Drawing Figures

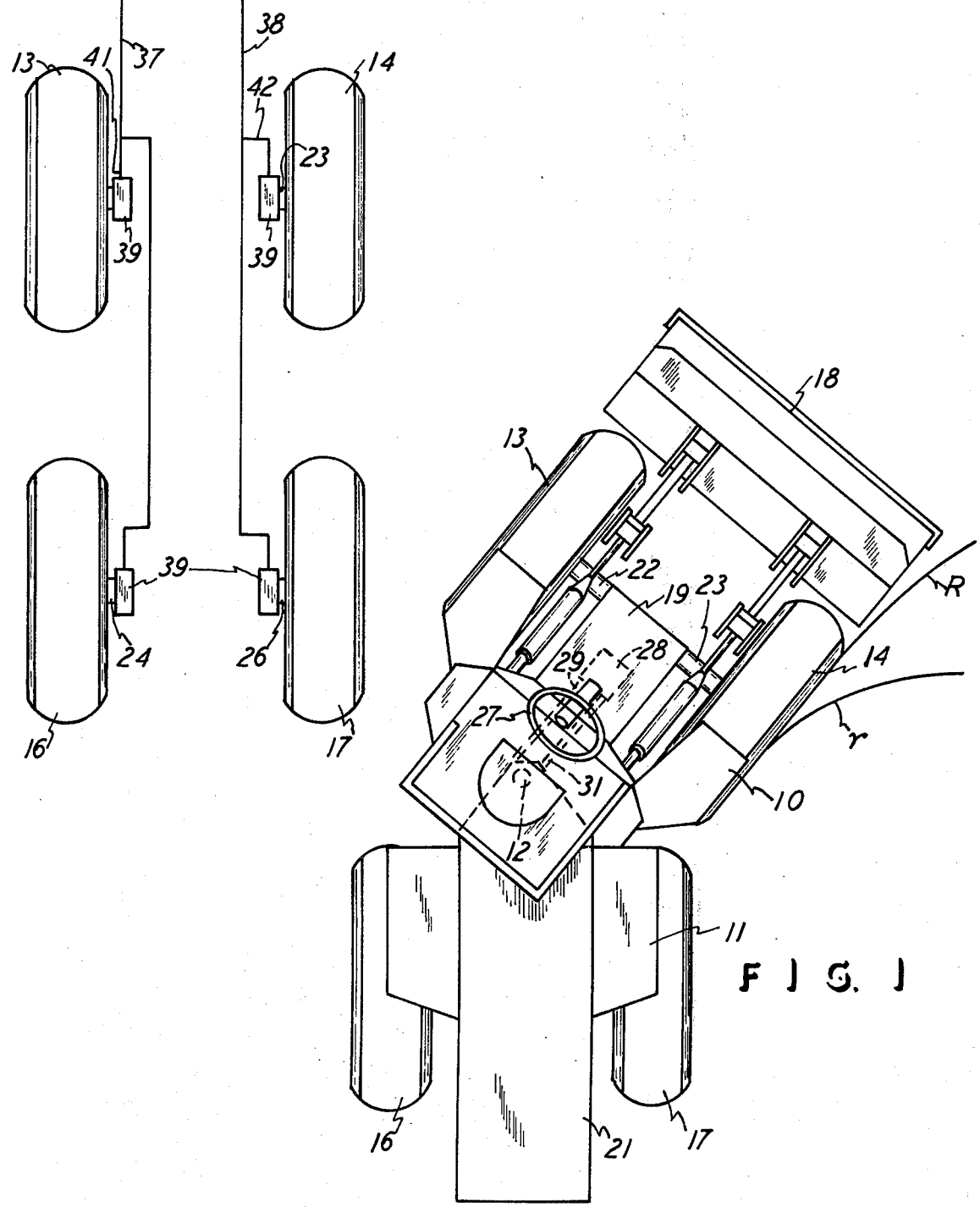

BRAKE SYSTEM FOR AN ARTICULATED VEHICLE

This invention relates to a brake system for an articulated vehicle of the tractor type and which has a front portion and a rear portion pivoted together about a vertical axis, and with the front portion being steerable relative to the rear portion and with a brake system for enhancing the turning of the vehicle.

BACKGROUND OF THE INVENTION

The prior art is already aware of articulated vehicles which have two portions pivotally secured together, such as that shown in U.S. Pat. No. 3,433,502. These two vehicle portions can be steered relative to each other for steering the vehicle about a turning axis, and U.S. Pat. No. 3,157,239 and reissue 26,635 show mechanisms and arrangements for steering these articulated vehicles. Still further, the prior art is also aware of constructions which provide brake systems for vehicles, such as tractors or the like, and wherein individual ground-engaging vehicle wheels can have the individual wheel brake applied and this can be for the purpose of enhancing the turning of the vehicle, such as in U.S. Pat. No. 1,050,686 and 3,054,476 and 3,863,991. Still further, the prior art is aware of vehicle brake systems wherein the wheel brakes on each side of the vehicle can be applied separately, such as in U.S. Pat. No. 3,589,207. Still further, the prior is already aware of vehicle wheel brake systems wherein each of the four wheels of the vehicle can have a wheel brake separately applied through actuation of four separate brake pedals, such as in U.S. Pat. No. 2,922,482.

In the present invention, an articulated vehicle is provided and has steering mechanism for initial steering and turning of the vehicle, and the four ground wheels have a brake system applied thereto wherein the two wheels on the right hand side of the vehicle can be stopped from rotation by applying those wheel brakes and thus enhance the turning of the vehicle, and likewise on the other side of the vehicle. Accordingly, the present invention provides an articulated vehicle wherein the turning radius of the vehicle can be a very minimum radius and thus the smallest turning circle is achieved, and this is possible by means of the brake system wherein only two brake pedals are required and the wheels on opposite sides of the vehicle have their brakes separately applied but in unison.

Accordingly, the present invention provides an improvement for the steering and turning of an articulated vehicle, such as by employing a special brake system which is not disclosed in nor possible with respect to the prior art referred to above.

Still further, the present invention provides a brake system for an articulated vehicle wherein the steering or turning radius of the vehicle can be at an absolute minimum, and thus maximum maneuvering of the vehicle is possible, all as compared to the prior art. Further, in accomplishing this and the aforementioned objectives, the present invention provides a brake system which is relatively inexpensive and which is easily provided and does not require any special components or parts nor does it require any special skill or maneuvering on the part of the operator in order to achieve the desirable results mentioned above.

Other objects and advantages will become apparent upon reading the following description in light of the accompanying drawings.

BRIEF DESCRIPTION OF THE DRAWINGS

FIG. 1 is a top plan view of an articulated vehicle of this invention and showing the vehicle in a turning position.

FIG. 2 is a top plan view of the portion of the vehicle of FIG. 1 and with the brake system shown related thereto.

DETAILED DESCRIPTION OF THE PREFERRED EMBODIMENT

The drawings show the articulated vehicle to include the front portion 10 and the rear portion 11 which are articularly and pivotally connected together by means of the usual upright pivot connection designated 12. The vehicle is shown to have two front wheels 13 and 14 and two rear wheels 16 and 17, and these wheels of course support the vehicle on the ground and are provided as parts of the vehicle, in the usual manner of providing the articulated vehicle shown which is in the form of a tractor. Thus a forwardly mounted loader bucket 18 is connected to the tractor vehicle shown in FIG. 1, and the bucket is shown as simply one example of utilitarian use of the articulated vehicle shown. The vehicle also has body or frame members, such as the members 19 and 21 which are shown and indicated to be actually the members pivotally connected by the pivot connection 12. Also, the front wheels 13 and 14 are shown to have the individual axles or wheel spindles 22 and 23, and the rear wheels are shown to have their individual spindles or axles 24 and 26, all in the usual manner of providing an articulated vehicle of this tractor type, such as shown in U.S. Pat. Nos. 3,433,502 and reissue No. 26,635.

The vehicle also has steering mechanism, which includes the steering wheel 27 and the unit 28 and steering rams or jacks 29 and 31 which interconnect between the vehicle front portion 10 and the vehicle rear portion 11 for the turning or steering of the front portion relative to the rear portion, all in a conventional arrangement, such as indicated in U.S. Pat. No. 3,157,239.

Thus, the articulated vehicle has its pivotally connected front and rear portions 10 and 11, and they are steerable relative to each other, and FIG. 1 shows the vehicle with the front portion 10 turned such that the vehicle would make a turn about a radius having an arc designated R which of course has a turning axis or center about which the arc R is generated. However, at this point, it will be mentioned that the brake system hereinafter described can be utilized on the articulated vehicle shown, such that the turning radius can be a smaller arc or radius, such as designated r in FIG. 1, and thus with the brake system of this invention the vehicle can be turned on a much shorter turning radius, as desired. FIG. 2 particularly shows the brake system of this invention, and it will be noted that there are two brake pedals 32 and 33 suitably and operably connected to the vehicle as parts thereof, and such connection may be substantially conventional, and the brake system also includes a power supply controlled by the pedals 32 and 33, such as pressurized air or other fluid in a tank designated 34. It will of course be understood by one skilled in the art that the pressurized fluid in the tank or container 34 is generated by the prime mover of the vehicle itself, and a fluid line 36 extends from the reservoir 34 and to the brake foot pedals 32 and 33. Additionally, the brake system has the connecting lines 37 and 38 suitably connected to the brake pedals 32 and 33, again in any conventional manner known by one skilled in the art, and the lines 37 and 38 extend along opposite sides of the fore-and-aft plane of the vehicle, as indicated in FIG. 2. The lines 37 and 38 are indicated to be flexible fluid lines which carry the air or hydraulic pressure, whichever is utilized, to the respective sides of the vehicle, and the lines are flexible so that they can accommodate the turning of the vehicle, as shown in FIG. 1. Each ground-engaging wheel of the vehicle has a brake 39 suitably operatively connected with the wheel, such as connecting to the wheel axle or spindle as shown, and the front wheel brakes 39 have a brake line 41 and 42 connected with the respective lines 37 and 38, as shown. Likewise, the real wheel brakes 39 are operatively connected with the respective lines 37 and 38, in any suitable arrangement.

With the description and as shown in the drawings, it will be seen and understood that the operator can apply the brakes 39 on the right side of the vehicle and thus prevent the right side wheels 14 and 17 from turning, for instance after the vehicle is placed in the turning position indicated by the turning arc R. That is, depressing the pedal 33 would cause the right side wheels 14 and 17 to be nonrotatable, and thus the vehicle will be able to do a skid type steer and thus turn on the turning arc r.

Conversely, the operator could depress the pedal 32 and thus cause the vehicle to turn to the left in the described type of skid steer mentioned. Thirdly, the operator could depress both pedals 32 and 33 simultaneously, and that would cause a uniform stopping of the vehicle in the direction that the vehicle might have been moving, and that operation would not be for the skid type steer as fully shown in FIG. 1 by the arc r, but it could be a conventional or simple type of stop, or it could be utilized for applying a control type of turning of the vehicle if the wheels on one side of the vehicle were stopped in rotation more or less from the wheels on the opposite side of the vehicle, for instance.

Therefore, there is provided an articulated vehicle with a brake system which is sufficiently selective such that the turning radius of the vehicle can be shorter than that normally achieved by the steering mechanism itself, and the same mechanism for achieving this smaller turning radius, namely the brake system described, can also be utilized for the normal braking of the vehicle without regard to the skid type steering described. Thus, the brakelines 36 and 37 and 38 are described as being fluid-type lines, and there is also the lines 43 which are indicated as interconnecting the line 36 and the lines 37 and 38 by the intervention of the brake pedals 32 and 33, again in a conventional manner which is known to one skilled in the art as to how to make a brake pedal having a fluid line controlled thereby, and U.S. Pat. No. 3,863,991 shows one arrangement of a brake system of the fluid type. The respective brakelines 37 and 38 extend uninterruptively and uniformly to and between the respective pairs of wheel brakes on the left and right hand side of the vehicle, and thus the lines 37 and 38 extend in a series connection with the brakes 39 on the respective left and right hand sides of the vehicle.

What is claimed is:

1. A brake system for an articulated vehicle comprising an articulated vehicle having a front portion and a rear portion pivotally connected together in tandem about an upright axis for steering said portions relative to each other to effect turning of the vehicle, a steering mechanism including an operator controlled steering wheel and being interconnected between said portions for steering said portions and establishing a steering radius for a maximum steering articulation, a left-side wheel and a right-side wheel mounted on each of said portions for supporting the vehicle on the ground, a wheel brake operatively connected with each of said wheels to present a pair of said brakes on each side of said vehicle, a flexible brake line connected exclusively separately and respectively between each of said pairs of wheel brakes on the two said left-side wheels and the two said right-side wheels, each respective said brake line extending uninterruptively and uniformly to and between said pairs of wheel brakes for separate and independent actuation of said pairs of wheel brakes, and two brake pedals mounted on said vehicle and with each thereof exclusively separately and respectively connected with said brake lines for braking the two said left-side wheels and the two said right-side wheels selectively and independently of the other two, said flexible brake lines being sufficiently flexible and of lengths to extend between each said pairs of brakes at the time when said maximum steering articulation is effected and to thereby have the respective said pair of brakes stop rotation of said wheels on the side of said vehicle toward the axis of the steering radius to thereby effect a further shortened steering radius.

* * * * *